United States Patent [19]
Edwards et al.

[11] Patent Number: 4,566,493
[45] Date of Patent: * Jan. 28, 1986

[54] VALVE ASSEMBLY

[75] Inventors: Floyd V. Edwards, Cedarville; Dennis A. Boehmer, Xenia, both of Ohio

[73] Assignee: Vernay Laboratories, Inc., Yellow Springs, Ohio

[*] Notice: The portion of the term of this patent subsequent to Aug. 20, 2002 has been disclaimed.

[21] Appl. No.: 703,850

[22] Filed: Feb. 21, 1985

[51] Int. Cl.⁴ .............................................. F16K 15/14
[52] U.S. Cl. .................................... 137/846; 137/850; 604/122; 604/247
[58] Field of Search ................................ 137/846–850, 137/316; 222/490, 494; 285/405; 604/83, 86, 122, 247

[56] References Cited

U.S. PATENT DOCUMENTS 2,138,605 11/1938 Landis .............................. 137/846 X
2,425,934 8/1947 Hamer ..................................... 138/44
2,460,957 2/1949 Whitfield ............................ 285/130
2,782,385 2/1957 Collett ................................. 336/136
3,789,871 2/1974 Tupper ............................ 137/850 X

FOREIGN PATENT DOCUMENTS 1130232 5/1962 Fed. Rep. of Germany ...... 137/846

Primary Examiner—Samuel Scott
Assistant Examiner—Allen J. Flanigan
Attorney, Agent, or Firm—Biebel, French & Nauman

[57] ABSTRACT

A valve assembly is disclosed for permitting relatively free flow in a flow path in a first direction and for preventing flow in the path in a second, opposite direction. The assembly includes a resilient flow regulator including a pair of lips arranged in a converging relationship to define a normally closed slit at the outer ends of the lips. An annular flange extends outwardly about the opposite end of the regulator. A housing outlet portion defines a housing interior approximating the shape of the regulator. The housing outlet portion further includes an annular collar disposed outwardly adjacent the base of each planar surface. The regulator is diposed within the housing outlet portion with the flange contained within the collar, and with the lips being adjacent to but not in contact with the interior housing surface. A cover plate is attached to the collar for securing the regulator and for sealing the housing. Beveled surfaces along the housing interior engage the regulator flange for centering the regulator within the housing. Alignment tabs are provided on each regulator lip for cooperating with recesses in the planar surfaces of the housing outlet portion. Alignment notches are provided within the collar, one of which cooperates with an alignment key formed on the inlet portion cover plate.

7 Claims, 8 Drawing Figures

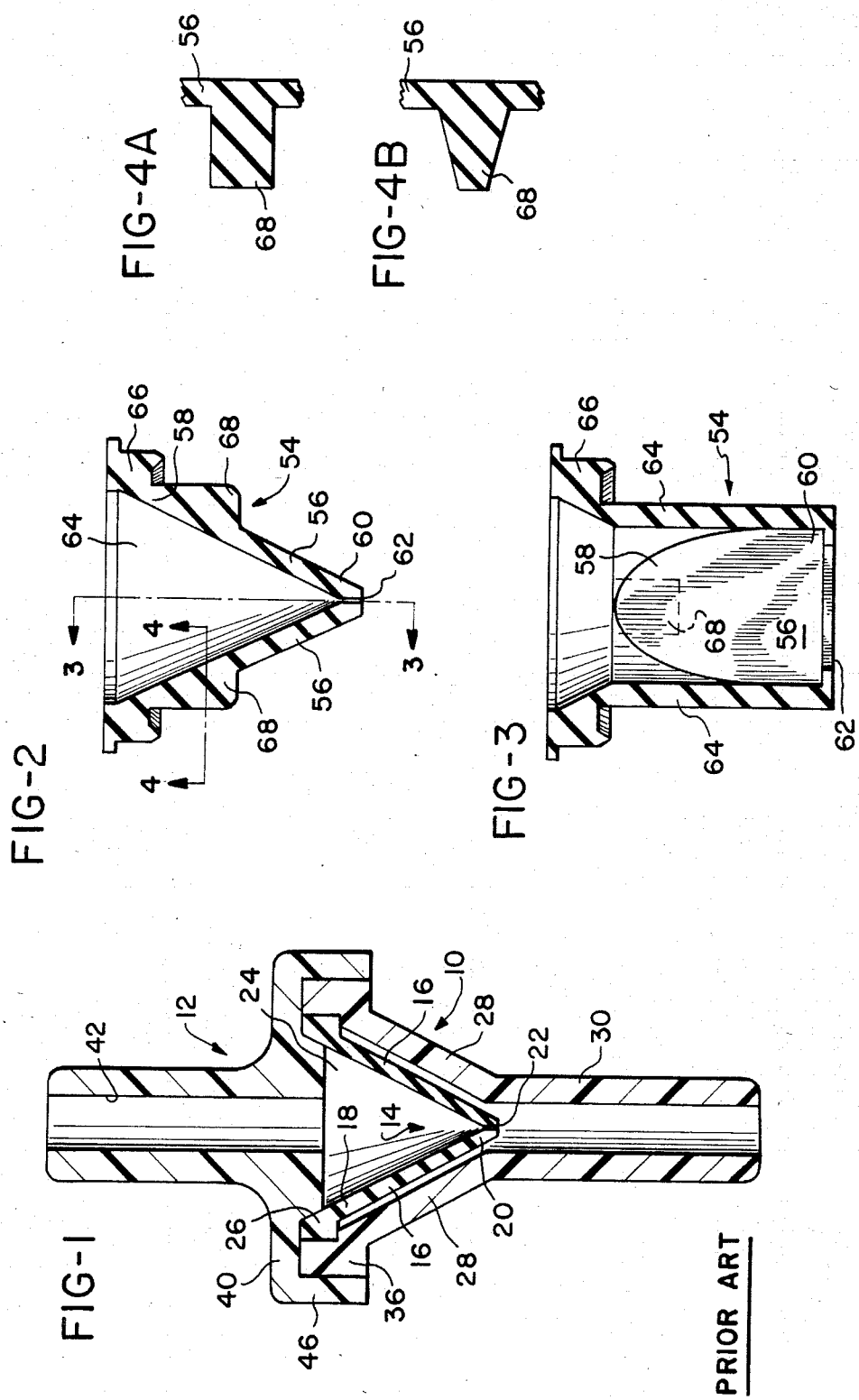

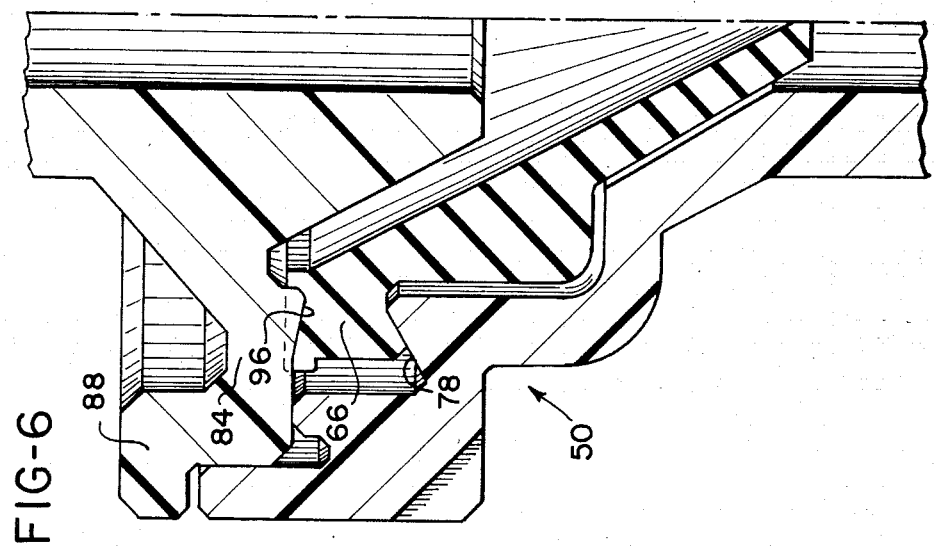
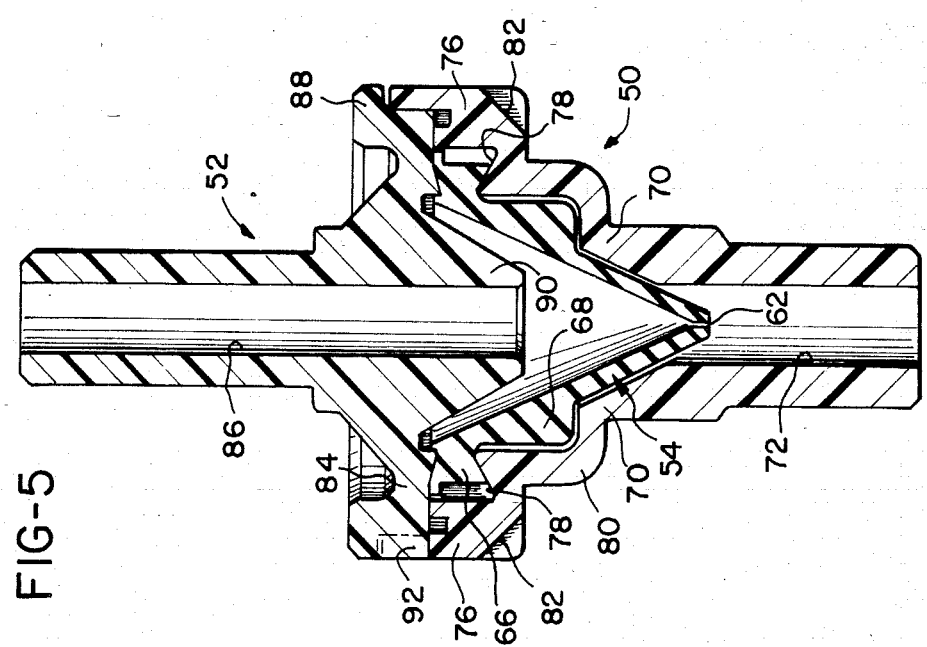

VALVE ASSEMBLY

BACKGROUND OF THE INVENTION

The present invention relates generally to flow regulation apparatus, and more particularly, to a valve assembly adapted to permit substantially free flow through the valve in a first direction, while preventing flow through the valve in a second, opposite direction. Even more particularly, the present invention relates to valves commonly known as the "duckbill" type.

Duckbill valves have been known for some time and have been used in a variety of applications, several examples being shown in U.S. Pat. Nos. 3,822,720 and 3,901,272. Such a valve typically includes a housing into which is mounted a resilient flow regulator member having as its primary operative components a pair of lips arranged in a converging relationship from an open end at the base of the lips to a normally closed outer end. At the closed end of the regulator, the lips are located adjacent each other so as to define a normally closed slit therebetween. The regulator is mounted within the housing in a sealed relationship so that flow through the housing must pass through the regulator as well. In a first or forward direction, flow enters the housing and passes into the regulator through the open end, moving toward the normally closed end. The flow pressure against the resilient lips opens the slit, allowing the flow to pass out of the regulator and tne housing. When flow enters the housing from a second or a reverse direction, however, flow contacts the regulator at its normally closed end, with the flow pressure against the resilient lips holding the slit in its closed position, thereby preventing flow through the valve assembly.

Frequently, valves of this type are used in medical environments, and one application for the valve is as part of a medical solution administration set. Such a set is used to deliver fluids such as plasma, medicines and the like from a fluid supply source, such as a bottle or bag, intravenously to a patient. The valve assembly is disposed within a fluid conduit to prevent flow in a backward direction toward the source, and is typically included in an administration set having a Y-site located downstream from the valve into which medicine or other fluids are injected at a pressure higher than the primary fluid flow.

One problem encountered with use of duckbill valves of conventional design in an administration set arises from the fact that whenever fluid flow is commenced through the valve, air bubbles typically collect around the valve assembly. Once fluid flow is established, these bubbles must be carried away with the fluid flow, so that they will not obstruct or interfere with the smooth and metered flow of fluid through the administration set.

A solution to this problem is described in commonly-assigned U.S. Pat. No. 4,535,818, in which a duckbill valve assembly similar to that shown in FIG. 1 is disclosed. Referring to this drawing, the assembly housing includes an outlet portion 10 and a cooperating inlet portion 12. Portions 10 and 12 are preferably molded from a transparent acrylic plastic material, although many other materials could be used, depending upon the particular application for the valve assembly.

A flow regulator member 14, molded as a single piece from a material such as rubber or resilient plastic, is formed in a roughly conical, hollow shape. A pair of lips 16 form a portion of regulator 14, each lip 16 having a base region 18 and an outer end 20. Lips 16 are disposed in a converging relationship so that lips 16 are adjacent each other at their outer ends 20. Lips 16 thus form a normally closed slit 22 to define a normally closed end for regulator 14.

Curved side walls 24 interconnect lips 16 and define an open end for regulator 14 opposite slit 22. An outwardly extending flange 26 is formed around the open end of regulator 16 adjacent the bases 18 of lips 16.

Outlet portion 10 of the housing defines a housing interior that approximates the shape of regulator 14. A pair of planar walls 28 forming part of outlet portion 10 define a pair of planar surfaces for the housing interior. Planar walls 28 are arranged in a converging relationship toward an outlet end of portion 10, where an outlet port 30 communicates with the housing interior.

Planar walls 28 are interconnected by curved walls, and an annular collar 36 extends around the open end of outlet portion 10. As a result, an annular shelf is defined, so that regulator 14 may be positioned within the housing interior by placement of flange 26 against collar 36. When so placed, lips 16 are disposed substantially adjacent to, but not in contact with, planar walls 28 of outlet portion 10. Outer ends 20 of lips 16 are then located at the outlet end of portion 10, so that fluid flow passing through slit 22 is directed into outlet port 30.

The housing inlet portion 12 includes a circular cover plate 40 through which an inlet port 42 communicates. A sealing ring 46 extends perpendicularly around the periphery to cover plate 40. (It should be noted that, altnough the valve assembly is shown as substantially circular in cross-section, see e.g., cover plate 40, other configurations are also usable, such as oval, rectangular or square.)

After regulator 14 is placed within outlet portion 10, inlet portion 12 is positioned thereon so that sealing ring 46 surrounds annular collar 36. Inlet and outlet portions 10 and 12 are fastened together along the portions of sealing ring 46 and cover plate 40 that are in contact with annular collar 36, to provide a sealed housing for regulator 4.

Housing portions 10 and 12 may be fastened by a variety of methods. For example, a glue or adhesive may be applied along annular collar 36. However, since the valve assemblies are manufactured in large quantities, it has been preferable to seal the housing portions 10 and 12 by ultrasonic welding, a process in which the parts to be joined are stimulated by ultrasonic vibrations to achieve sufficient atomic movement to cause coalescence. While such a tecnnique considerably speeds up the assembly process, it also causes problems in the performance of a significant number of the valve assemblies produced.

During the welding process, housing portions 10 and 12 are subjected to ultrasonic vibrations typically having a frequency in the range of 20 to 40 kHz. As a result, the interior component (i.e., regulator 14) will have a tendency to "dance" within housing portions 10 and 12 until the portions are welded to firmly secure regulator 14 in place. Additionally, some radial twisting of the housing portions following their assembly but prior to complete welding is unavoidable, due to practical limitations in constructions of the valve assembly and the welding equipment. In either case, despite careful placement of regulator 14 within outlet and inlet portions 10 and 12, the regulator 14 in a percentage of valve assemblies produced will be radially twisted within the housing, and after welding, will be secured in a such a position. However, as can be seen from FIG. 1, relatively little clearance is provided between lips 16 of regulator 14 and planar surfaces 28 of outlet portion 10 to discourage air bubble formation and to facilitate bubble clearance during fluid flow and initiation through the valve. Consequently, only a relatively little twisting of regulator 14 will cause the regulator to contact the interior surfaces of outlet portion 10. Due to the resilient nature of regulator 14, such contact will cause distortion of the regulator 14 with the result that slit 22 at the outer ends of lips 16 can be prevented from fully closing or being closed. This in turn prevents the valve assembly from completely preventing flow through the assembly in reverse direction.

Moreover, the foregoing potential causes for valve assembly leakage can be present regardless of how carefully the regulator 14 is placed within housing portion 10. As a practical matter, however, it is difficult to properly orient the regulator within the housing portion. Tne close fit between regulator 14 and the housing interior to minimize bubble formation and facilitate bubble clearance may require clearance between the housing interior and regulator of as little as 0.001" (0.0025 cm). Thus, any misalignment can bring the lips 16 of regulator 14 into contact with planar surfaces 28 of the housing interior, thereby causing slit 22 to be partially opened. This misalignment can be rotational, but can also be caused by regulator 14 being placed into housing portion 10 at a slightly off-center position, or at a slight angle with respect to the horizontal. In either case, valve assembly leakage can result.

What is needed, therefore, is a modification to the assembly structure of a duckbill valve that will prevent unwanted twisting and misalignment of the regulator within the valve housing during assembling and ultrasonic welding of the housing. Such modifications should not affect the ability of the valve assembly to prevent air bubble formation and facilitate bubble removal during flow initiation, nor should it interefere with valve assembly manufacturing procedures so as to complicate or make more expensive production of such assemblies.

SUMMARY OF THE INVENTION

The present invention may be incorporated within a valve assembly for use within a flow path for permitting relatively free flow along the path in a first direction and for preventing flow in the path in a second, opposite direction. A flow regulator is constructed as a single piece from a resilient material, and includes a pair of lips, each of the lips having a lip base and an outer end. The lips are arranged in a converging relationship to define for tne regulator an open end adjacent the lip bases, and a normally closed end at the lip outer ends, whereby the lips are disposed adjacent each other to define a normally closed slit therebetween. The regulator further includes one side wall interconnecting the lips, and an annular flange extending outwardly at the open end. A housing outlet portion defines a housing interior approximating the shape of the regulator. The housing interior has a pair of planar surfaces corresponding to the pair of lips, each of the planar surfaces having a planar surface base. The surfaces are arranged in a converging relationship from their bases toward an outlet end, the housing outlet portion further including an outlet port communicating with the outlet end. An annular collar is disposed outwardly adjacent the planar surface bases.

A housing inlet portion includes a cover plate and an inlet port communicating therethrough.

The regulator is disposed within the housing outlet portion with its annular flange contained within the annular collar and with the lip outer ends extending toward the outlet end of the housing interior. The lips are substantially adjacent to, but not in contact with, the planar surfaces of the housing interior. The cover plate is attached to the annular flange for securing the regulator and for sealing the housing interior.

In order to solve the problems set forth above, the regulator is further provided with a tab formed on at least one of the lips extending outwardly therefrom near its base. The housing outlet portion includes a recess formed within at least one of the inner surfaces for receiving the tab when the regulator is properly positioned within the outlet portion. Further, at least one first notch is defined within the collar, whereby the notch may be engaged for proper orientation of the outlet portion for receiving the regulator.

In addition, the housing inlet portion may include at least one key extending from the cover plate, with the collar on the housing outlet portion including a second notch for receiving the key when the housing portions are attached.

The tab, the key, and the first and second notches may all be formed along a single plane.

When the valve assembly is assembled, the housing outlet portion defines a first sealing ring along the housing interior extending from the collar to the planar surface bases. The cover plate defines a second sealing ring adjacent the flange of the regulator, the first and second sealing rings being disposed on opposite sides of the flange. In addition to the improvements noted above, the valve assembly may be formed wherein at least one of the first and second sealing rings is provided with a bevel, the bevel being defined so that the flange is compressed between the first and second sealing rings to a greater degree along the portion of the flange adjacent the lip bases than along the portion of the flange adjacent the collar.

Accordingly, it is a primary objective of the present invention to provide a duckbill valve assembly in which the housing interior conforms closely to the regulator configuration to inhibit air bubble formation and facilitate bubble clearance during flow initiation, but in which the regulator is positioned and securely held to prevent radial twisting of the regulator during assembly of the valve housing. It is also a primary object of the present invention to provide such a valve assembly in which the assembly components are properly positioned during tne assembly process so as to result in a minimal number of completed assemblies which exhibit leakage. Additional objects of the invention are to provide such a valve assembly in which valving performance or air bubble prevention and clearance characteristics are not adversely affected, additional steps in the production of a valve assembly are not required, and the complexity of the components of the valve assembly or their cost of production are not significantly increased.

Other objects and advantages of the present invention will be apparent from the following description, the accompanying drawings and the appended claims.

BRIEF DESCRIPTION OF THE DRAWINGS

FIG. 1 is a sectional view of a prior art duckbill valve assembly of the type to which the present invention may be applied;

FIG. 2 is a sectional view of a regulator member of a valve assembly in accordance with the present invention;

FIG. 3 is a sectional view taken generally along line 3—3 of FIG. 2;

FIG. 4A is an immediate sectional view of a portion of the regulator member taken generally along line 4—4 of FIG. 2;

FIG. 4B is an immediate sectional view of an alternative embodiment for the regulator member, also taken generally along line 4—4 of FIG. 2;

FIG. 5 is a sectional view similar to FIG. 1, but showing the valve assembly in accordance with the present invention;

FIG. 6 is an enlarged view of a portion of FIG. 5; and

DETAILED DESCRIPTION OF THE PREFERRED EMBODIMENT

Figure 7:
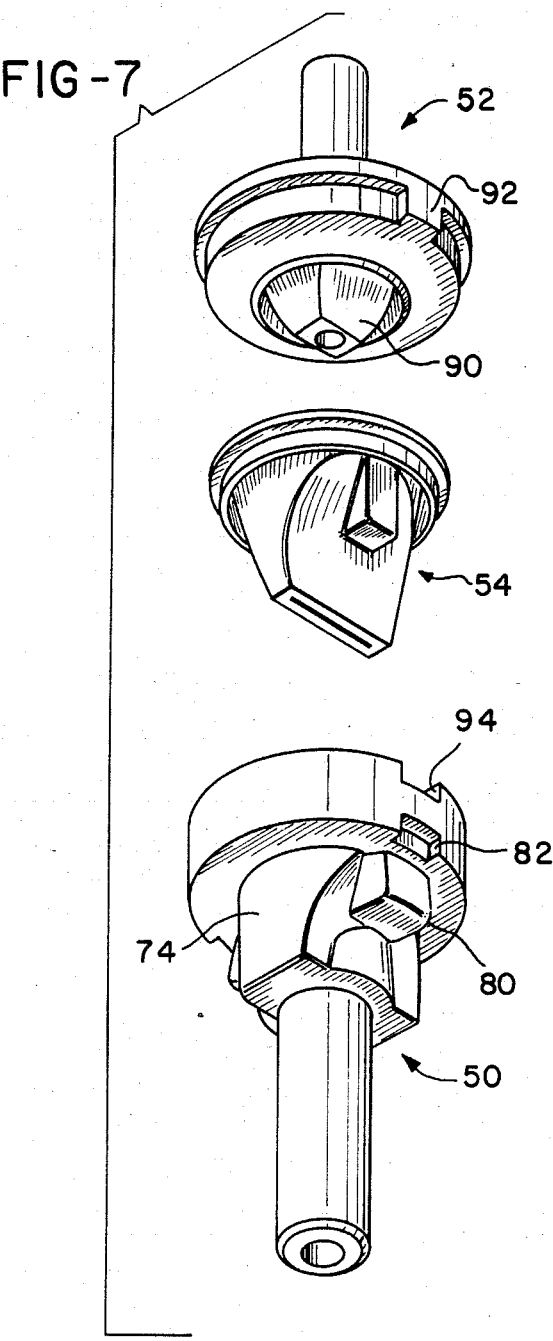
FIG. 7 is an exploded isometric view showing the entire valve assembly.

The valve assembly of the present invention can be seen by reference to FIGS. 2-7. In general, the valve assembly is similar in construction and operation to the valve assembly shown in FIG. 1. However, the valve assembly of FIGS. 2-7 incorporates a number of significant improvements.

Referring now in particular to FIG. 5, the valve assembly includes an outlet housing portion 50 and an inlet housing portion 52, within which is secured a flow regulator 54. Referring to FIG. 2, regulator 54 includes a pair of lips 56, each lip 56 having a base region 58 and an outer end 60. Lips 56 are disposed in a converging relationship so that they are adjacent each other at their outer ends. Lips 56 thus form a normally closed slit 62 at the normally closed end of regulator 54.

Curved side walls 64 interconnect lips 56 and define an open end for regulator 54 opposite slit 62. An outwardly extending flange 66 is formed around the open end of regulator 54 adjacent the bases 58 of lips 56.

Regulator 54 further includes a tab 68 formed on each of the lips 56 extending outwardly from the lip surface near the lip base 58. As shown in FIGS. 4A and 4B, tabs 68 may be either rectangular or trapezoidal in cross section, or can alterantively be of some other shape.

Returning now to FIG. 5, outlet portion 50 of the housing includes a pair of planar walls 70 that define a pair of planar surfaces for the housing interior. Walls 70 are arranged in a converging relationship toward an outlet end of portion 50, where an outlet port 72 communicates with the housing interior.

Planar walls 70 are interconnected by a curved wall 74 (see FIG. 7), and an annular collar 76 extends around the open end of outlet portion 50. As a result, an annular supporting surface 78 is defined, so that regulator 54 may be positioned within the housing interior by placement of flange 66 of the regulator against supporting surface 78 within collar 76. When so placed, lips 56 are disposed substantially adjacent to but not in contact with planar walls 70 of outlet portion 50.

Each planar wall 70 is provided with a recess 80 into which a tab 68 on a lip 56 of regulator 54 is fitted as the regulator is inserted into the housing portion. Thus, tabs 68 and recesses 80 cooperate to radially align regulator 54 into the proper rotational position within outlet portion 50. Additionally, tabs 68 and recesses 80 serve to secure regulator 54 rotationally once positioned, so that any "dancing" caused during the ultrasonic welding process will not move regulator 54 out of position. Similarly, any inadvertent twisting of the housing portions 50 and 52 will not adversely affect regulator 54. However, since tabs 68 are formed on lips 56 near their bases 58, the tabs have no detrimental effect upon the performance of the completed valve assembly. In fact, it is suspected that tabs 68 may even improve valve performance, by stiffening lips 56 along the portions thereof away from slit 62.

Of course, for tabs 68 to engage recesses 80, regulator 54 must be in its proper rotational position with respect to housing portion 50 as the regulator is placed into the housing portion. This is particularly so due to the resilient nature of regulator 54, so that tabs 68 cannot provide any large degree of aligning force. Thus, housing portion 50 must be aligned prior to receiving regulator 54.

As seen in FIGS. 5 and 7, collar 76 of housing portion 50 is provided with a pair of notches 82 that are formed into collar 76. These notches 82 then serve as points of engagement with cooperating holding apparatus during the assembly operation, to insure that housing portion 50 is properly aligned to receive regulator 68.

It will be noted that notches 82 and recesses 80 are formed along the same vertical plane. This is so that during the machining of the molds within which housing portions 50 are formed, table movements of the cutting tools and the like are held to a minimum. Tnus, sources of alignment error caused during mold construction are reduced. Moreover, maintaining notches 82 and recesses 80 along the same vertical plane helps to reduce sources of alignment error during assembly.

Inlet housing portion 52 includes a cover plate 84 through which an inlet port 86 opens. Once regulator 54 has been placed within outlet portion 50, cover plate 84 is placed against collar 76 to secure regulator 54 in place. An annular ring 88 is attached at the periphery of cover plate 84, to increase the bonding surface between housing portions 50 and 52.

A projection 90 is centered on the inner side of cover plate 84 with inlet port 86 opening therethrough. As can best be seen in FIG. 7, projection 90 is shaped to approximate the interior configuration of regulator 54, and extends into regulator 54 to approximately one-third to one-half of the distance to slit 62. Projection 90 serves as a means of reducing interior volume space to facilitate faster air surging of the valve assembly.

In addition, inlet portion 52 includes at least one key 92 tnat cooperates with a notcn 94 formed into collar 76. Key 92 and notch 94 provide for proper rotational alignment of housing portion 52 when place on portion 50, to insure that projection 90 fits properly within regulator 54. In addition, key 92 and notcn 94 prevent any radial twisting between housing portions 50 and 52 which could dislodge regulator 54. It will be noted that key 92 and notch 94 are located within the same vertical plane as notch 82 and recess 80, for the reasons which have been stated above. Further, as an alternative embodiment, key 92 and notch 94 may be reversed; i. e., key 92 may be formed on collar 76 while notch 94 is formed into inlet portion 52.

As yet a further improvement, it will be noted from FIG. 6 that supporting surface 78 within housing portion 50 is formed along a bevel sloping downwardly with respect to the center axis of housing portion 50. Similarly, a beveled surface 96 extends as a ring along cover plate 84 on the surface thereof which is contact with flange 66 of regulator 54. These beveled surfaces 78 and 96 can be regarded as defining sealing rings for regulator 54.

By comparing flange 66 as shown in FIGS. 2 and 3 with the manner in which flange 66 fits between surfaces 78 and 96 shown in FIG. 6, it can be seen that greater compression is placed upon flange 66 along that portion adjacent the bases 58 of lips 56 than along that portion which is adjacent collar 76. It should be recognized that this compression produces a force component in a downward, outward direction around the entire circumference of flange 66. This uniform outward stretching of flange 66 serves to center regulator 54, and particularly slit 62, within housing portion 50. Thus, any inadvertent misalignment of regulator 54 within housing portion 50, particularly angular misalignment from a horizontal plane, will tend to be overcome.

It should also be recognized that beveled surfaces 78 and 96 need not be linear in cross section as shown in FIG. 6. What is important is that surfaces 78 and 96 place greater compression along the inner portion of flange 66 than along the outer. Thus, the cross section of surfaces 78 and 96 could in fact be curved, stepped, or any other of a number of variations.

Finally, it should be noted that while the present invention is particularly adapted to valve assemblies which are assembled using ultrasonic welding, the invention is equally applicable to valve assemblies in which the housing portions are secured by an appropriate adhesive or solvent. Similarly, it would be possible to construct a valve assembly in which the housing portions snap together by providing, for example, a ridge and corresponding groove along a contact region between collar 76 and cover plate 84. The present invention could be applied to such an arrangement, and would be beneficial in that twisting or other misalignment problems arising during the assembly process could be avoided.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. Valve assembly for use within a flow path for permitting relatively free flow in said flow path in a first direction and for preventing flow in said path in a second, opposite direction, comprising:

a flow regulator constructed as a single piece from a resilient material, said regulator including a pair of lips, each of said lips having a lip base and an outer end;

said lips being arranged in a converging relationship to define for said regulator an open end adjacent said lip bases, and a normally closed end at said lip outer ends whereat said lips are disposed adjacent each other to define a normaly closed slit therebetween, said regulator further including at least one side wall interconnecting said lips and an annular flange extending outwardly at said open end;

a housing outlet portion defining a housing interior approximating the shape of said regulator, said housing interior having a pair of planar surfaces corresponding to said pair of lips, each of said planar surfaces having a planar surface base, said surfaces being arranged in a converging relationship from said planar surface bases toward an outlet end, said housing outlet portion further including an outlet port communicating with said outlet end and an annular collar disposed outwardly adjacent said planar surface bases; and a housing inlet portion having a cover plate and an inlet port communicating therethrough;

said regulator being disposed within said housing outlet portion with said annular flange contained within said annular collar and said lip outer ends extending toward said outlet end of said housing interior, and with said lips being substantially adjacent to but not in contact with said planar surfaces;

said regulator further including a tab formed on at least one of said lips and extending outwardly therefrom near said lip base;

said housing outlet portion further including a recess formed within at least one of said planar surfaces for receiving said tab therein when said regulator is properly positioned within said outlet portion, and further including at least one first notch defined within said collar whereby said notch may be engaged for proper orientation of said outlet portion for receiving said regulator; and said cover plate being attached to said annular collar for securing said regulator by contact with said flange and for sealing said housing interior.

2. A valve assembly as defined in claim 1, wherein said recess and said first notch are defined to lie along a single plane.

3. A valve assembly as defined in claim 2, wherein said regulator includes a tab formed on each of said lips, and wherein said housing outlet portion includes a recess formed within each of said planar surfaces.

4. A valve assembly as defined in claim 1, wherein said housing inlet portion includes at least one key extending from said cover plate, and wherein said collar on said housing outlet portion includes a second notch for receiving said key.

5. A valve assembly as defined in claim 4, wherein said tab, said key and said first and second notches all lie along a single plane.

6. A valve assembly as defined in claim 1, wherein said collar on said housing oulet portion includes at least one key extending from said collar, and wherein said housing inlet portion includes a second notch defined into said cover plate for receiving said key.

7. A valve assembly as defined in claim 1, wherein said housing inlet portion includes a projection carried on an inner surface of said cover plate for extension partially into said regulator through said open end tnereof when said cover plate is attached to said annular collar, said projection having said inlet port opening therethrough and defining a shape approximating the shape of the portion of said regulator adjacent thereto.

* * * * *